Patented Nov. 24, 1931

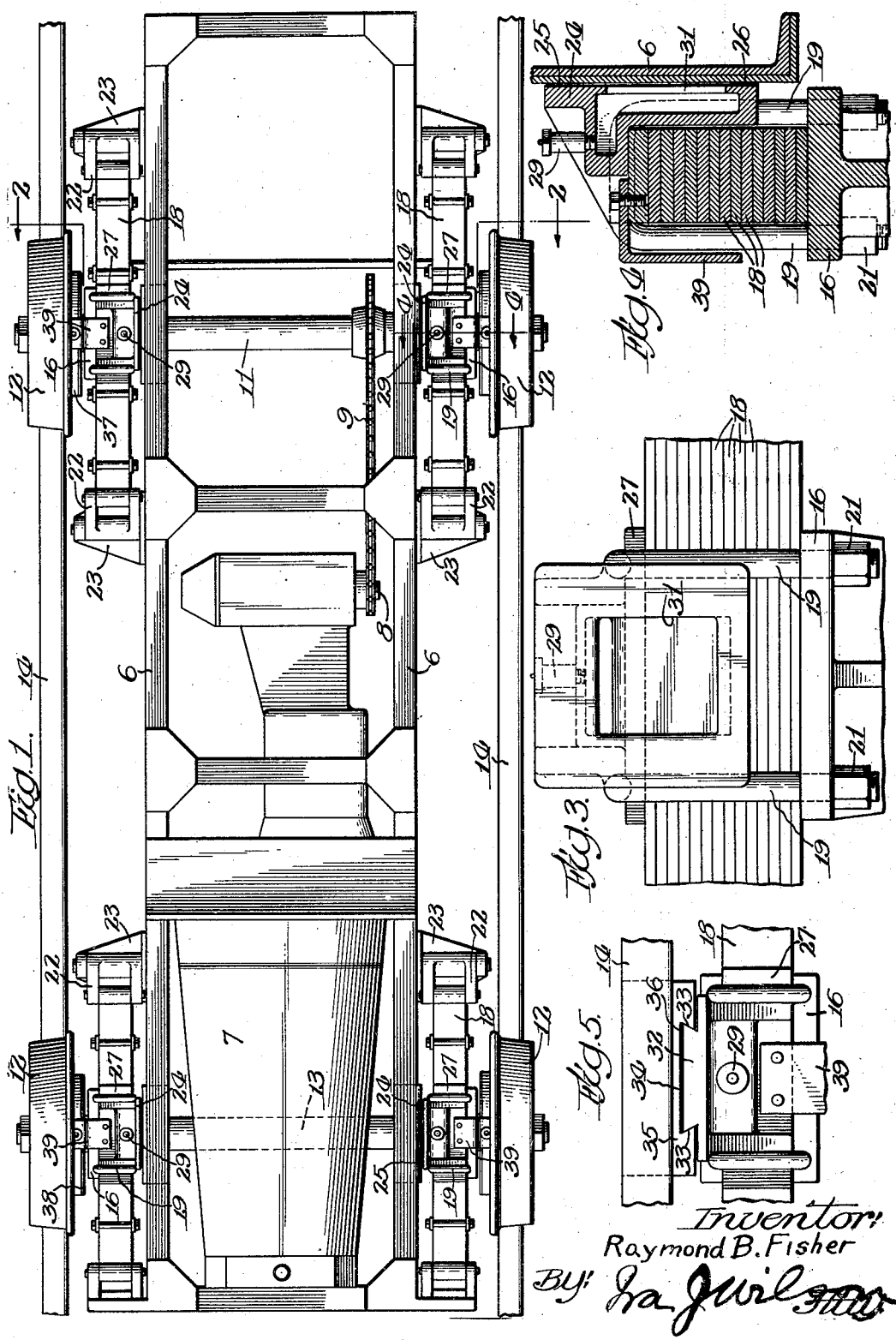

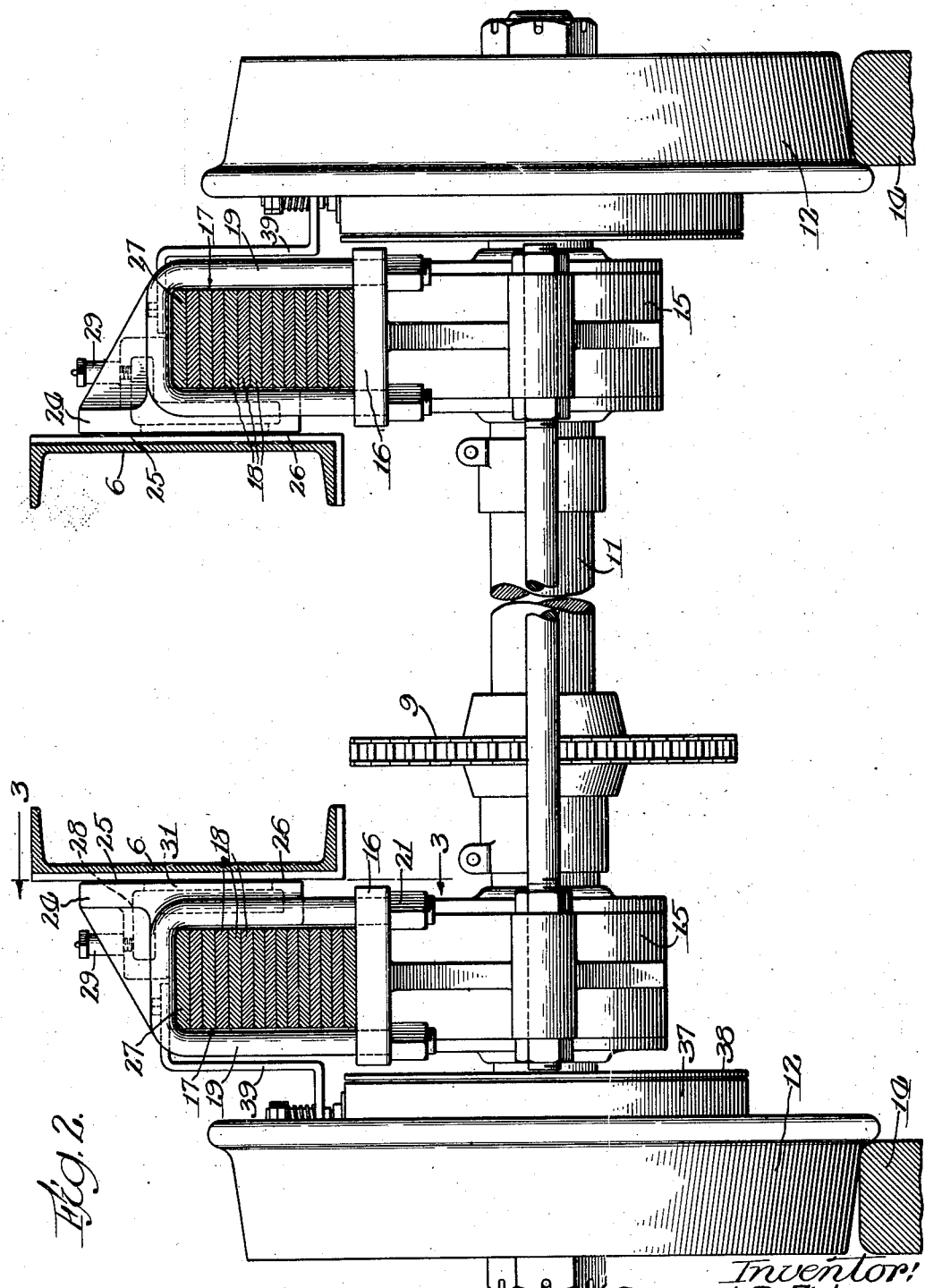

1,833,211

UNITED STATES PATENT OFFICE

RAYMOND BENSON FISHER, OF HARVEY, ILLINOIS, ASSIGNOR TO THE BUDA COMPANY, OF HARVEY, ILLINOIS, A CORPORATION OF ILLINOIS

VEHICLE CONSTRUCTION

Application filed November 17, 1928. Serial No. 320,029.

This invention relates to vehicle constructions in general and more particularly to a means for preventing lateral relative movement between the axle and chassis while permitting vertical relative movement therebetween.

It is frequently highly desirable, particularly in the case of a vehicle which is intended to change its course while travelling at high speed, to take the strain due to the tendency of the chassis body to continue its movement without change of direction off of the springs.

The primary object of this invention is accordingly to provide a vehicle construction embodying means for taking the strain off of the springs due to lateral thrust on the chassis and for preventing lateral relative movement between the axles and chassis.

Other and further objects of this invention will be apparent as the same bscomes better understood from an examination of the specification and claims in conjunction with the accompanying drawings, wherein:

Fig. 1 is a plan view of a gasoline engine driven railroad car embodying this invention;

Fig. 2 is an enlarged fragmentary sectional view taken at the line 2—2 of Fig. 1;

Fig. 3 is a fragmentary view taken at the line 3—3 of Fig. 2;

Fig. 4 is a fragmentary section taken at the line 4—4 of Fig. 1;

Fig. 5 is a fragmentary plan view showing a modification.

Referring to the drawings more particularly:

Reference character 6 designates the frame or chassis of a vehicle, in this instance a gasoline engine driven railroad car. This car is provided with an engine (not shown) enclosed by a hood 7, a transmission shaft 8, adapted to be driven by said engine, and a chain 9 connecting said shaft with the rear axle 11. Car wheels 12 of the rear axle 11 and the front axle 13 of the car are adapted to confine the same to a track 14.

Each of the axles 11 and 13 is provided with spaced bearings (not shown) and housings 15 therefor. The housings 15 are each provided with a flanged top 16 adapted to support one of the four springs 17 of the vehicle. The springs 17 are each made up of a plurality of leaves 18 which are held together by a pair of inverted U-bolts 19 extending through the flanges on the respective tops 16 and secured thereto by nuts 21.

The opposite ends of each spring 17 is pivotally attached to the chassis at longitudinally spaced positions thereon through the intermediary of swivels 22 and supporting brackets 23 therefor, one for each end of each spring.

When the car is in operation the axles will be permitted by reason of the yieldable characteristics of the springs to move vertically relatively with respect to the chassis.

In order to prevent lateral relative movement between the chassis and axles and at the same time permit the vertical relative movement therebetween, there is provided integral with each pair of bolts 19 a hollow shoe 24. This shoe 24 presents a vertical bearing surface 25 in a longitudinal plane adapted to engage with a similar surface on a wearing plate 26 attached to the chassis 6. This surface 25 on the shoe 24 is spaced inwardly of the spring to which the respective shoe is attached.

A saddle plate 27 is provided on top of the spring for seating the central portions of the bolts 19 and the shoe.

Each shoe is provided with a chamber 28 adapted to contain lubricant and an absorbent carrier therefor such as a cotton waste. The lubricant is supplied to the chamber 28 by means of a suitable fitting 29 communicating therewith and threadedly secured at the top of the shoe. A rectangular aperture 31 is provided in the shoe for establishing communication between the chamber 28 and the surface 26.

Each shoe of each pair, there being four shoes altogether, one for each spring, co-operates with its opposite shoe to the extent that one shoe prevents lateral relative movement between the axle and chassis in one direction while the opposite shoe prevents such movement in the opposite direction and together they prevent this lateral movement in both directions.

Brake mechanism for each wheel including a brake band 37 adapted to cooperate with a drum 38 on the respective wheel is supported on a Z-bar 39 bolted to the respective saddle plate 27.

In Figure 5 there is shown a modification in which one shoe is adapted to prevent lateral relative movement between the chassis and axle in both directions the shoe being provided with a projecting portion 32 having inwardly tapered side edges 33 and a bearing surface 34. In this modification the wearing plate here designated as 35 on the chassis, is provided with a vertical dovetail groove 36 adapted to receive the projection 32 and engage with the surface 34 for preventing lateral relative movement between the chassis and axle in one direction and adapted to engage with the edges 33 of said projection to prevent such movement in the opposite direction.

The operation and advantages of both embodiments will be apparent without further description.

I am aware that many changes may be made without departing from the principles of this invention and I therefore do not wish to be limited to the details shown or described.

I claim:

1. In combination with a chassis frame and an axle of a vehicle and spring means connected to the axle and frame for yieldingly supporting the frame and transmitting traction thereto, a shoe connected to the axle and a bearing member connected to the frame and adapted to engage said shoe to prevent lateral relative movement of the frame and axle in one direction and permit the relative movement of said frame and axle in a vertical direction.

2. In combination with a chassis frame and an axle of a vehicle and spring means connected to the axle and frame for yieldingly supporting the frame and transmitting traction thereto, a shoe connected to the axle and a bearing member connected to the frame and adapted to engage said shoe to prevent relative movement of the frame and axle in one lateral direction and at the same time permit relative movement of said frame and axle in three directions at right angles to the first said direction.

3. In combination with a chassis frame and an axle of a vehicle and a spring attached intermediate its ends to the axle and at its ends to the frame for supporting the frame on the axle and for transmitting traction from the axle to the frame, of a shoe attached to said spring in proximity to the connection thereof with the axle and a bearing member connected to the frame and adapted to engage said shoe to prevent lateral relative movement of the frame and axle in one lateral direction and permit the relative movement of said frame and axle in any direction in a vertical plane.

In witness of the foregoing I affix my signature.

RAYMOND BENSON FISHER.